(12) United States Patent
Mathis et al.

(10) Patent No.: US 7,492,734 B2
(45) Date of Patent: Feb. 17, 2009

(54) METHOD OF ACCESS TO A CHANNELIZED NETWORK FROM A PACKET DATA NETWORK

(75) Inventors: James E. Mathis, Barrington, IL (US);
Robert A. Biggs, Evanston, IL (US);
Gary W. Grube, Barrington, IL (US);
Matthew C. Keller, Algonquin, IL (US);
Robert D. LoGalbo, Rolling Meadows, IL (US); Daniel J. McDonald, Cary, IL (US); Donald G. Newberg, Hoffman Estates, IL (US); Brian R. Poe, Cary, IL (US)

(73) Assignee: Motorola, Inc., Schaumburg, IL (US)

( * ) Notice: Subject to any disclaimer, the term of this patent is extended or adjusted under 35 U.S.C. 154(b) by 526 days.

(21) Appl. No.: 11/117,191

(22) Filed: Apr. 28, 2005

(65) Prior Publication Data

US 2006/0245425 A1 Nov. 2, 2006

(51) Int. Cl.
*H04Q 7/00* (2006.01)
(52) U.S. Cl. .................. 370/328; 370/352; 370/390; 370/401; 370/432; 370/466
(58) Field of Classification Search .................. 370/312, 370/328, 351, 352, 390, 401, 432, 465, 466, 370/474
See application file for complete search history.

(56) References Cited

U.S. PATENT DOCUMENTS

| | | | | |
|---|---|---|---|---|
| 5,847,771 | A | * 12/1998 | Cloutier et al. | 348/564 |
| 5,987,331 | A | 11/1999 | Grube | |
| 7,221,660 | B1 | * 5/2007 | Simonson et al. | 370/312 |
| 2003/0174670 | A1 | * 9/2003 | Mar et al. | 370/328 |
| 2004/0114634 | A1 | * 6/2004 | Liu | 370/521 |
| 2004/0190468 | A1 | * 9/2004 | Saijonmaa | 370/312 |
| 2006/0262808 | A1 | * 11/2006 | Lin et al. | 370/466 |

* cited by examiner

*Primary Examiner*—Dwayne D Bost
*Assistant Examiner*—Inder P Mehra
(74) *Attorney, Agent, or Firm*—Valerie M. Davis

(57) ABSTRACT

A method for providing a mobile device in a packet data network access to a channelized network is disclosed. At a gateway between the two networks, a first channelized network message that is encapsulated in a first IP data packet from the packet data network is received. The first channelized network message is retrieved and reformatted for sending over the channelized network. The gateway then receives a second channelized network message from the channelized network. An identifier of a mobile device associated with the second channelized network message is retrieved and an IP address for the identified mobile device is determined. Then, the gateway encapsulates the second channelized network message into a second IP data packet and sends the encapsulated second channelized network message to the identified mobile device in the packet data network.

20 Claims, 2 Drawing Sheets

METHOD OF ACCESS TO A CHANNELIZED NETWORK FROM A PACKET DATA NETWORK

FIELD OF THE INVENTION

The present invention relates generally to wireless communication systems and in particular to the field of cross-network communication.

BACKGROUND

Providing a mobile device which is capable of communicating over a packet data network access to a channelized network, such as a radio network, via the packet data network is important. Access to the channelized network is particularly important when the channelized network is an Association of Public Safety Communication Officers Project 25 (APCO 25) network. Currently, a mobile device in a packet data network does not have access to an APCO 25 network via the packet data network. Accordingly, there is a need for access to a channelized network from a packet data network.

BRIEF DESCRIPTION OF THE FIGURES

The present invention is illustrated by way of example and not limitation in the accompanying figures, in which like references indicate similar elements, and in which.

Figure 1:
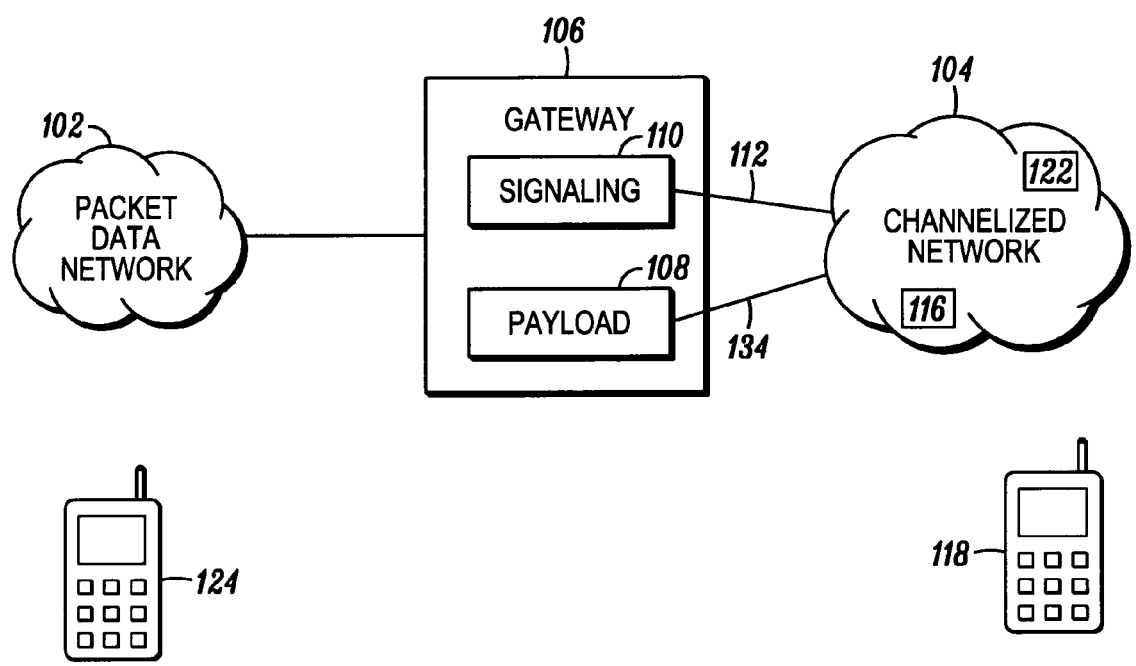
FIG. 1 is an example of a simple block diagram illustrating an RF communication system in accordance with some embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail an embodiment of the present invention, it should be observed that the present invention resides primarily in combinations of method steps and apparatus components. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

A method and apparatus for providing access to a channelized network from a packet data network is disclosed. Referring to FIG. 1, a radio frequency (RF) communication system 100 according to an embodiment of the present invention illustratively comprises a mobile device 124, a gateway 106 which interfaces between a packet data network 102 and a channelized network 104. Both networks 102, 104 comprise sites for providing RF coverage over a specific geographic area.

For example, referring to FIG. 1, sites 116, 122 of the channelized network 104 are generally fixed in location and comprise a control and voice channel that adheres to an APCO 25 (also known as TIA 102) standard. Further, the channelized network 104 is preferably an APCO 25 system such as an Astro 25™ system manufactured by Motorola, Inc. where the channelized network further comprises one or more zones with Zone Controllers where each Zone Controller is also referred to as a call server. Even though an embodiment of the present invention is described with reference to the channelized network 104 being an APCO 25 network, embodiments of the present invention are intended to work with a Trans European Trunked Radio (TETRA) network. Thus, the mention of APCO 25 is not meant to be limiting.

Referring to the packet data network 102, the sites (not shown) of the packet data network 102 may be fixed or mobile and adhere to an Internet Protocol (IP) based protocol. The packet data network 102 may be an 802.11 wireless local area network (WLAN), wherein the mobile device 124 and sites (not shown) of the packet data network 102 are configured to operate in accordance with the ANSI/IEEE (American National Standards Institute/Institute of Electrical and Electronics Engineers) 802.11 wireless LAN standards. Alternatively, packet data network 102 may adhere to another ANSI/IEEE 802 wireless standard, such as 802.15.1, 802.15.3, 802.15.4, 802.16, 802.20, 802.22, and the like. The mention of ANSI/IEEE 802.11 is not to be construed as a limitation. In such an example, the sites (not shown) of the packet data network 102 may be termed access points (APs) and/or transmitters. Further, the packet data network 102 may be a carrier data network as that term is known to one of ordinary skill in the art. An example of such a carrier data network is a CDMA 1xEV-DO commercial network.

In FIG. 1, the channelized network 104 is illustrated with only two sites 116, 122 for the purpose of ease of illustration. However, it should be understood by those of ordinary skill in the art that both networks 102, 104 may be designed with any number of sites. Further, in FIG. 1, only two networks 102, 104 are shown for ease of illustration. However, it should be understood by those of ordinary skill in the art that more than two networks may co-exist where the gateway 106 interfaces between the more than two networks.

In an exemplary embodiment, the gateway 106 functions as an interface between the packet data network 102 and the channelized network 104. The gateway 106 comprises a signaling function 110 and a payload function 108. The gateway 106 shown in FIG. 1 accepts APCO 25 Common Air Interface messages encapsulated in an IP data packet and reformats the messages as necessary to interface to the channelized network 104. Even though a single gateway 106 with combined functionality for signaling 110 and payload 108 is shown in FIG. 1, the functions of signaling 110 and payload 108 could be decomposed into multiple devices.

The endpoints of communication in the. RF communication system 100 are mobile devices, e.g. mobile devices 118, 124. The mobile devices 118, 124 are generally communication devices that may be either sources or recipients of payload and/or signaling messages routed through the RF communication system 100. As such, the mobile devices 118, 124 may be any suitable type of wireless communications device capable of communicating within the RF communication system 100, for instance, a laptop computer, a personal digital assistant, a voice handset, or any other suitable device as will be appreciated by those of skill in the art. In an exemplary embodiment, the mobile devices are APCO 25 radios equipped with a WLAN modem. The mobile devices 118, 124 may also be connected to a fixed communications infrastructure, if desired.

As is known in the art, for a communication to take place in the channelized network 104, a circuit is set up between two endpoints, e.g. mobile devices, before a communication takes place. In contrast, the packet data network 102 supports IP addressing of packets. As is known in the art and as used herein, packets are units of payload and are not sequentially processed by the packet data network 102.

Practitioners skilled in the art will appreciate that the RF communication system 100 may include various other communication devices not specifically shown in FIG. 1. For example, the channelized network 104 may comprise a link, such as, for example a T1 line or E1 digital carrier system that connects the site 116 to a public switched telephone network (PSTN) via a telephone gateway, a paging network or short message system via a paging gateway, and a facsimile machine or similar device via fax gateway or modem.

In addition, the packet data network 102 may be connected via an access point (AP) to an underlying network that may be implemented, for instance, as a wired network or as a mesh network having fixed or mobile access points. Further, the packet data network 102 may provide access to a number of content sources, such as the Internet or various Intranets. In support thereof, the packet data network 102 may include any number or type of wire line communication device(s), site controller(s), comparator(s), telephone interconnect device(s), internet protocol telephony device(s), call logger(s), scanner(s) and gateway(s, collectively referred to herein as a fixed device(s).

In operation, the gateway 106 functions to translate APCO 25 packets between the packet data network 102 and the APCO 25 network 104. As shown in FIG. 1, a signaling interface 112 is defined to connect the signaling 110 function to the APCO 25 network 104. In an exemplary embodiment, the signaling interface 112 is an ALSLIP interface that connects a site controller of a site, e.g. site 116, to the site's Zone Controller. In an alternative embodiment, signaling interface 112, e.g. an ALSLIP interface, connects a Zone Controller of the channelized network 104 to the gateway 106. In any case, the signaling interface 112, e.g. an ALSLIP interface, connects the gateway 106 to the channelized network 104 in general terms. Further shown in FIG. 1, a payload interface 114 is defined to connect the payload 108 function to the APCO 25 network 104. In an exemplary embodiment, the payload interface 114 is an XIS interface that carries payload between the site and the Zone Controller on a traffic channel of the APCO 25 network 104.

Figure 2:
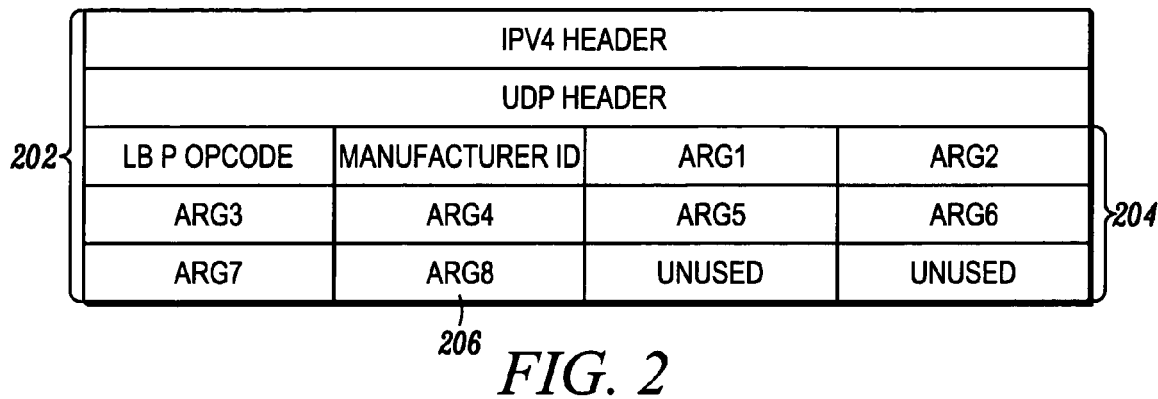
FIG. 2 is an example APCO 25 message encapsulated in an IP data packet in accordance with some embodiments of the invention.

Referring to FIG. 2, shown is an example APCO 25 message encapsulated in an IP data packet 202. Shown is an IP data packet 202 adhering to a UDP/IPv4 protocol, however, the IP data packet 202 may also be formatted to UDP/IPv6 standards. Notice that each block of the APCO message 204 is of a fixed size and that the APCO 25 message 202 comprises a last block field 206. Because each block (also known as a trunking control block) is of a fixed size and the APCO 25 message 202 has a last block 204, more than one APCO 25 message may be encapsulated into one IP data packet 202. In an exemplary embodiment, APCO 25 multi-block messages are combined into a single IP data packet 202. That is, in an exemplary embodiment, a single APCO 25 control block is not split across multiple IP data packets.

In operation, the gateway 106 receives and transmits APCO 25 messages that are encapsulated in an IP data packet. The gateway 106 receives APCO 25 messages that are encapsulated in an IP data packet from the packet data network 102 and decapsulates the APCO 25 message from the IP data packet to forward to a site, e.g. site 116, in the APCO 25 network 104. Once in the APCO 25 network 104, the APCO 25 message is processed according to the APCO 25 standard as outlined in TIA 102.

In operation, the mobile device, e.g. mobile device 124, powers-on and initializes its IP network interface. Initializing the IP network interface means to get the mobile device's IP address from a domain name server (DNS) using dynamic host control protocol (DHCP) or other well-known means. Additional events that trigger the mobile device to initialize its IP network interface include a change in the mobile device's IP address (from network failure or otherwise), a change in a point of attachment to the packet data network, and a change to a different network interface.

Following initialization of the IP network interface, the mobile device retrieves the IP address of the mobile device's home channelized network. There may be a number of ways to distribute mobile devices among various channelized networks. One way is to assign a mobile device to a channelized network that is geographically closest to the mobile device. Another is to perform load sharing using well-known techniques to distribute the number of mobile devices associated with each gateway. In any case, each mobile device is assigned a home channelized network. In one embodiment, retrieving the IP address of the mobile device's home channelized network may be carried out by performing a DNS lookup of the name. In one embodiment, the home channelized network name is constructed by taking a unique system ID of the mobile device's home channelized network expressed as a text string and combining it with another text string to form a valid domain name for the home channelized network's gateway. The IP address returned from the DNS lookup is the IP address of the gateway for mobile device.

Upon retrieving the IP address of the home channelized network, namely the IP address of the gateway 106, the mobile device confirms itself with the gateway 106. Because, the packet data network 102 does not broadcast signaling as in the channelized network 104, the gateway 106 sends specific IP data packets with APCO 25 messages that contain status or network specific messages (also referred to as RSS messages) as unicast messages as necessary.

In one embodiment, the mobile device 124 confirms itself with the gateway 106 by sending a manufacturer-specific NET_STS_QUERY message encapsulated in UDP/IP. The gateway 106 responds to the message with an NET_STS_BCST message that contains the information normally broadcast on a control channel of the channelized network 104. In this case, the RFSS_STS_BCST is unicast to the mobile device 124. The mobile device 124 compares the value of a WACN ID field received in the NET_STS_BCST with known valid codes. If the WACN ID is a valid code, the mobile device 124 shall consider itself confirmed on the gateway. If the WACN ID is not a valid code, then the mobile device 124 will continue searching for a gateway 106.

In one embodiment, performing the DNS lookup returns more than one IP address. For example, the home channelized network may be associated with more than one IP address or there may be other channelized networks that may function as the home channelized network for the mobile device 124. Thus, if additional IP addresses were returned by the DNS lookup, then the mobile device contacts those additional gateways. If additional IP network interfaces are available, the mobile device switches to another packet data network (e.g., switching to a different wireless interface), performs another DNS lookup, and contacts the resulting gateway. When all combinations have been tried and the mobile device does not receive confirmation from a gateway, then the mobile device 124 waits for a period of time before retrying the initialization process.

Continuing, once the mobile device has found a gateway, the mobile device performs registration with the channelized network 104. In one embodiment, the registration is performed as outlined in TIA 102-AABD FIG. 5-1 and as shown in TIA 102-AABD FIG. 6-1. In general, the mobile device 124 creates an APCO 25 Unit Registration message (e.g. U_REG_REQ) which is encapsulated in an IP data packet addressed to the gateway 106. As mentioned, the APCO 25 Unit Registration message is defined in the TIA 102 standard.

Once the gateway 106 receives the IP data packet containing the registration message from the mobile device 124, the gateway 106 removes the registration message from the IP data packet and processes the registration message. In one embodiment, a signaling 110 function of the gateway 106 retrieves the mobile device's identification (e.g. SUID) from the U_REG_REQ message and reformats the registration message for sending to the channelized network 104. Further, the gateway 106 maintains knowledge of the mobile device's identification and the mapping to the mobile device's IP address so that future messages can be properly sent to and from the mobile device 124.

In one embodiment, a Zone Controller of the channelized network 104 will respond with an APCO 25 registration response message (e.g. U_REG_RSP). When the gateway 106 receives the registration response message, it retrieves an SUID from the registration response to lookup the mobile device's IP address. The gateway 106 maintains the mapping between the SUID, IP address, and a WUID assigned by the Zone Controller in an IP/mobile device table. Then, the gateway 106 repackages the registration response message in an IP data packet and forwards the IP data packet to the mobile device 124.

Following registration, the mobile device creates an APCO 25 affiliation message, encapsulates it in an IP data packet and sends the IP data packet to the gateway 106. In one embodiment, the signaling 110 function of the gateway 106 extracts a talk group ID from the IP data packet and looks up the talk group ID in a talk group/mobile device table where the talk group/mobile device table maps talk group IDs with IP addresses of mobile devices. If the talk group ID is found in the talk group/mobile device table, the IP address of the mobile device is stored; otherwise a new entry is created for the talk group ID and the IP address of the mobile device is stored. The mapping of talk group IDs and IP addresses of mobile devices is used to duplicate and send audio packets to the mobile device during a group call.

In one embodiment, the signaling 110 function converts the affiliation message into ALSLIP and sends the affiliation message to a Zone Controller of the channelized network 104. The Zone Controller will respond with an acknowledgement that the signaling 110 function forwards to the mobile device 124. Having registered and affiliated with the channelized network 104, the mobile device 124 is able to communicate with the channelized network 104 from the packet data network 102.

If, for any reason, the Zone Controller rejects the affiliation, the signaling 110 function removes the mobile device's IP address from the list of devices associated with the talk group ID from the talk group/mobile device table in the gateway 106. Further, the mobile device's entry may also be removed from the talk group/mobile device table when the mobile device deregisters and/or after a period of inactivity.

In one embodiment, following successful registration and affiliation of the mobile device 124, the signaling 110 function of the gateway may perform a series of network tests to estimate transmission characteristics. Such tests may include sending a PING packet that is immediately acknowledged by the mobile device 124 to measure round-trip times. Such tests may be conducted using manufacturer-specific APCO 25 messages encapsulated in an EP data packet. Further, the gateway 106 may use the measured round-trip time in calculating when the mobile device 124 is ready to receive payload.

Further following registration and affiliation of the mobile device 124, the signaling 110 function of the gateway 106 may send one or more manufacturer-specific APCO 25 messages that contain configuration information necessary for the mobile device to communicate with the channelized network 104. As described above, such messages are encapsulated in an IP data packet before being sent by the gateway 106 to the mobile device 124. As used herein, configuration information may include IP addresses, UDP port numbers, and other parameters, such as a count of the number of audio frames to be bundled into each IP data packet.

As mentioned above, now that the mobile device is registered and affiliated with the channelized network 104, the mobile device 124 is able to communicate with the channelized network 104 from the packet data network 102. As such, a user of the mobile device 124 may begin a push-to-talk (PTT) call by pressing the PTT button on the mobile device 124. Pressing the PTT button on the mobile device 124 creates an APCO 25 service request where the service request is encapsulated in an IP data packet and sent to the gateway 106. The mobile device may retransmit the APCO 25 request as specified in the TIA 102 standard. In any event, once the APCO 25 service request encapsulated in an IP data packet is received by the signaling function of the gateway 106, the gateway removes the APCO 25 service request from the IP data packet, converts the APCO 25 service request to ALSLIP format, and forwards the APCO 25 service request to the channelized network 104.

In one embodiment, a Zone Controller of the channelized network 104 processes the APCO 25 service request. Before starting the PTT call, the Zone Controller sends an ALSLIP get ready message to the gateway 106 where the get ready message identifies traffic destination or a talk group.

The gateway 106 handles the ALSLIP get ready message differently depending on whether or not the packet data network 102 uses power-saving techniques that delay the availability of mobile devices in the packet data network 102. If the mobile device 124 is immediately available, the gateway 106 returns an ALSLIP ready response message immediately to the Zone Controller in the APCO 25 network 104. If power-saving techniques are in use, the gateway 106 will wait to return the ALSLIP ready response message until the mobile device is expected to be ready. If the PTT call is a talk group call, then the gateway 106 looks up the list of mobile devices affiliated with the talk group. If this is the only mobile device using the gateway 106 in the talk group, the gateway 106 immediately returns an ALSLIP ready response message if the mobile device is known to be ready. If there are other affiliated mobile devices that are not active, the gateway 106 sends a message to each mobile device causing the mobile device to become active and sends an ALSLIP ready response message to the Zone Controller in the channelized network.

In an alternative embodiment, the gateway 106 may maintain knowledge of the activity state on the mobile devices in the packet data network 102, query the packet data network 102, and use a measured round-trip time to return the ALSLIP ready response message sooner than if the gateway 106 waits for a response from each mobile device. Further, as is known to one of ordinary skill in the art, techniques other than sending a message may be used to activate the mobile devices. Further, the gateway 106 may reduce call setup latency by requesting the packet data network to directly page the mobile device.

Figure 3:
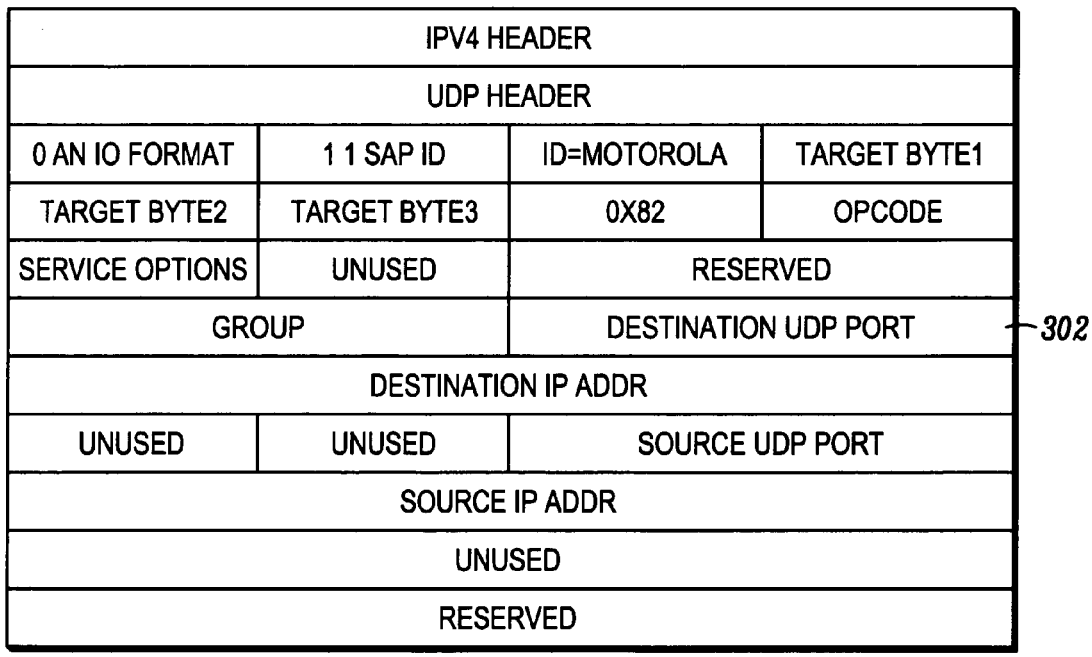
FIG. 3 is an example APCO 25 group call grant message encapsulated in an IP data packet in accordance with some embodiments of the invention.

If the PTT call is a request is for a talk group call, the channelized network 104 will send an APCO 25 call grant message to the gateway 106. As specified in TIA 102, an APCO 25 call grant message typically has information about an RF channel. Since such information is not applicable to the packet data network, the signaling function of the gateway 106 replaces the channel value with a dummy value, e.g. 0, in the APCO 25 call grant message and encapsulates the APCO 25 call-grant message in an IP data packet. In an alternate embodiment, the signaling 110 function of the gateway 106 creates a manufacturer-specific APCO 25 call grant message that includes IP address information 302 as shown in FIG. 3. Such an exemplary APCO 25 call grant message allows for multiple gateways to load share the payload of the RF communication system 100.

As mentioned above, the signaling 110 function of the gateway 106 looks up in the talk group/mobile device table the list of mobile devices affiliated with the talk group and associated IP addresses. The signaling function of the gateway 106 then sends an APCO 25 call grant message to each mobile device affiliated with the talk group. As is known, the APCO 25 call grant message may be transmitted multiple times to ensure delivery to the mobile devices in the packet data network 102. As mentioned above, an example APCO 25 call grant message encapsulated in an IP data packet is shown in FIG. 3.

If the mobile device 124 has been granted permission, namely the mobile device 124 has received an APCO 25 call grant message encapsulated in an IP data packet, the mobile device 124 sends communications to the gateway 106. The gateway 106 then forwards the communications to the channelized network 104 for further processing. In one embodiment, the gateway 106 may process the communications locally and discard received communications from all but the current traffic source and forward the communications to other mobile devices using the gateway 106 to forward to the channelized network 104.

A user of the mobile device 124 may end a push-to-talk (PTT) call by releasing the PTT button on the mobile device 124. Releasing the PTT button on the mobile device 124 causes the mobile device to pad audio in the communication to the next logical data unit (LDU) boundary as specified in the APCO 25 standard. Further, the mobile device sends an APCO 25 dekey link control message encapsulated in an IP data packet to the gateway and the gateway communicates the APCO 25 dekey link control message to the APCO 25 network 104. In response, the channelized network 104 sends an APCO 25 call over message to all mobile devices in the PTT call.

A user of a mobile device 118 in the channelized network may request a call. When the user does so, a Zone Controller in the channelized network 104 sends an ALSLIP get ready control message to the gateway 106. As described before, if this is a request for a talk group call, the gateway 106 looks up the list of mobile devices affiliated with the talk group, and determines if each affiliated mobile device is active in the packet data network 102. If the affiliated mobile devices are not active, the gateway 106 sends a message to each inactive mobile device causing the inactive mobile device to become active. When the mobile devices of the request talk group are ready, the gateway 106 returns an ALSLIP ready response message to the channelized network 104.

When the Zone Controller affiliated with the mobile device 118 in the channelized network 104 decides to start the call, the signaling 110 function of the gateway 106 receives an APCO 25 call grant message from the channelized network 104. In an exemplary embodiment, the APCO 25 call grant message has information about the RF channel that is not applicable to the packet data network, so the signaling 110 function replaces the channel value and encapsulates the APCO 25 call grant message in an IP data packet. The signaling 110 function of the gateway then looks up in the talk group/mobile device table, the list of mobile devices affiliated with the talk group. Finally, the signaling function of the gateway 106 sends the APCO 25 call grant message to each mobile device affiliated with the talk group. The payload 108 function of the gateway then forwards payload packets to each mobile device in the talk group. Finally, when the user of the mobile device 118 in the channelized network 104 releases the PTT button, the gateway 106 receives indication of the released PTT button and sends an APCO 25 termination of audio message to the mobile devices in the talk group call.

In further embodiments, data communications whether in the packet data network 102 or in the channelized network 104 are tunneled through the gateway without manipulation by the gateway. In an exemplary embodiment, a layer 3 tunnel is utilized to provide data communications between the two networks 102. 104. Further yet, regardless of the type of APCO 25 message that is utilized in the channelized network 104, the APCO 25 message is encapsulated in an IP data packet for communication in the packet data network 102.

It will be appreciated that embodiments of the present invention described herein may be comprised of one or more conventional processors and unique stored program instructions that control the one or more processors to implement, in conjunction with certain non-processor circuits, some, most, or all of the functions described herein. The non-processor circuits may include, but are not limited to, a radio receiver, a radio transmitter, signal drivers, clock circuits, power source circuits, and user input devices. As such, these functions may be interpreted as steps of a method. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for providing a mobile device in a packet data network of an RF communications system access to a channelized network comprising the steps of:
   at a mobile device in the packet data network:
   retrieving IP configuration information wherein the IP configuration information comprises an IP address of a gateway that interfaces between the packet data network and the channelized network;
   sending a registration message encapsulated in an IP data packet to the IP address of the gateway, wherein the registration message adheres to a protocol utilized with the channelized network; and
   sending an affiliation message encapsulated in an IP data packet to the IP address of the gateway, wherein the affiliation message adheres to a protocol utilized with the channelized network.

2. The method of claim 1 wherein the channelized network adheres to at least one of an Association of Public Safety Communication Officers (APCO) Project 25 standard dated April 1995 and including subsequent revisions and Trans European Trunked Radio (TETRA) standard dated March 1996.

3. The method of claim 1 wherein the IP data packet adheres to at least one standard of IPv4 dated September 1981 and IPv6 dated December 1998 and including subsequent revisions.

4. The method of claim 1 further comprising the step of performing a DNS look up for retrieving the IP address of the gateway.

5. The method of claim 1 further comprising:
   sending a request for a talk group call to the gateway, wherein the request is encapsulated in an IP data packet and wherein the request adheres to a protocol utilized with the channelized network;
   sending a communication addressed to the gateway for the gateway to forward to the channelized network, wherein the communication is payload.

6. The method of claim 1 further comprising sending a dekey link control message to the gateway, wherein the dekey link control message is encapsulated in an IP data packet and wherein the dekey link control message adheres to a protocol utilized with the channelized network.

7. The method of claim 1 further comprising receiving a message from the gateway to become active in the packet data network.

8. A method for providing a mobile device in a packet data network of an RF communications system access to a channelized network comprising the steps of:
   at a gateway, wherein the gateway interfaces between the packet data network and the channelized network of the RF communication system:
   receiving a first channelized network message encapsulated in a first IP data packet from the packet data network, wherein the channelized network message adheres to a protocol utilized with the channelized network;
   retrieving the first channelized network message from the first IP data packet;
   reformatting the first channelized network message for sending over the channelized network;
   sending the reformatted first channelized network message to the channelized network;
   receiving a second channelized network message from the channelized network;
   retrieving an identifier of a mobile device associated with the second channelized network message from the second channelized network message;
   determining an IP address for the identified mobile device;
   encapsulating the second channelized network message into a second IP data packet for the packet data network; and
   sending the encapsulated second channelized network message to the identified mobile device in the packet data network.

9. The method of claim 8 wherein the first channelized message is at least one of a NET_STS_QUERY message, registration message, U_REG_REQ message, an affiliation message, a call request message, a dekey link control message, traffic, and data packet.

10. The method of claim 8 wherein the second channelized message is at least one of a NET_STS_BCST message, a registration response message, U_REG_RSP message, a PING packet, call grant message, traffic, termination of audio message, and call over message.

11. The method of claim 8 wherein the step of determining further comprises maintaining a table of identifiers of mobile devices in the packet data network and the mobile device's IP address.

12. The method of claim 8 further comprising the step of performing network tests to estimate transmission characteristics of the packet data network.

13. The method of claim 8 wherein the packet data network adheres to at least one of an IEEE 802 standard and a CDMA standard.

14. The method of claim 8 wherein the second IP data packet comprises more than one channelized network message.

15. The method of claim 8 wherein the second IP data packet is sent unicast to the mobile device.

16. The method of claim 8 further comprising the step of storing an identifier associated with a sender of the first data packet in a table of the gateway.

17. The method of claim 8 further comprising the step of maintaining a table of talk group IDs and IP addresses of mobile devices by extracting the talk group ID from affiliation messages and by extracting the IP address from the affiliation messages encapsulated in an IP data packet.

18. The method of claim 8 wherein the step of sending the encapsulated second channelized network message to the identified mobile device is delayed until the mobile device is ready to receive the encapsulated second channelized message.

19. The method of claim 8 wherein the step of encapsulating the second channelized network message into a second IP data packet for the packet data network further comprises replacing a channel value in the second channelized network message.

20. The method of claim 8 wherein the channelized network adheres to at least one of an Association of Public Safety Communication Officers (APCO) Project 25 standard and Trans European Trunked Radio (TETRA) standard.

* * * * *